United States Patent [19]
Romer et al.

[11] Patent Number: 5,661,555
[45] Date of Patent: Aug. 26, 1997

[54] METHOD AND APPARATUS FOR DETERMINING THE ROLL ANGLE POSITION OF A ROTATING FLYING BODY

[75] Inventors: Rudolf Romer, Kaarst; Gerd Wollmann, Oberhausen; Helmut Misoph, Lauf a.d. Pegnitz, all of Germany

[73] Assignees: Rheinmetall Industrie GmbH, Ratigen; TZN Forschungs-und Entwicklungszentrum Unterluss GmbH, Unterluss, both of Germany

[21] Appl. No.: 438,019

[22] Filed: May 8, 1995

[30] Foreign Application Priority Data

May 7, 1994 [DE] Germany ............... 44 16 210.3

[51] Int. Cl.$^6$ ............... G01B 11/26; G01C 1/00; F41G 7/00
[52] U.S. Cl. ............... 356/139.03; 244/3.13; 356/141.3
[58] Field of Search ............... 244/3.13; 356/141.3, 356/139.03

[56] References Cited

U.S. PATENT DOCUMENTS

| 4,384,759 | 5/1983 | Ferrante . | |
| 4,422,601 | 12/1983 | Chavany et al. | 244/3.13 |
| 4,441,669 | 4/1984 | Wich | 244/3.13 |
| 4,516,743 | 5/1985 | Sweeney et al. . | |
| 4,641,801 | 2/1987 | Lynch et al. | 244/3.14 |
| 5,478,028 | 12/1995 | Snyder | 244/3.11 |

FOREIGN PATENT DOCUMENTS 2 155 722  9/1985  United Kingdom .

Primary Examiner—Stephen C. Buczinski
Attorney, Agent, or Firm—Spencer & Frank

[57] ABSTRACT

A method and apparatus for determining the roll angle position of a rotating flying body (2) relative to a fixed station (1) with the aid of a laser (3) light beam (4, 24) emitted by the fixed station (1) and received by the flying body (2). To determine the roll angle position of the flying body located at an arbitrary position within the guide beam (4) precisely and simply, a phase-coded laser light beam (guide beam) is produced with the aid of an optical element, particularly a holographic optical element (6). This guide beam (14) is then decoded in a receiving apparatus (8) of the flying body by means of a further holographic element (11) that is rigidly connected to the flying body (2). The further holographic element (11) is configured such that maximum brightness or intensity only occurs at the receiving detector (13) if it is located parallel to the holographic element (11) on the side of the laser (3), i.e., non-mirror-symmetric information must be impressed upon the guide beam (4).

10 Claims, 2 Drawing Sheets

METHOD AND APPARATUS FOR DETERMINING THE ROLL ANGLE POSITION OF A ROTATING FLYING BODY

REFERENCE TO RELATED APPLICATIONS

This application is related to Applicant's concurrently filed allowed U.S. patent application Ser. No. 08/438,018, which corresponds to German application No. P 44 16 211.1, filed May 7, 1994, which are incorporated herein by reference.

This application claims the priority of German application Serial No. 44 16 210.3, filed May 7, 1994, which is incorporated herein by reference.

BACKGROUND OF THE INVENTION

The invention relates to a method of determining the roll angle position of a rotating flying body relative to a fixed station with the aid of a laser light beam emitted by the fixed station and received by the flying body. The invention further relates to an apparatus for performing the method.

In rotating projectiles in which a flight path correction is performed during flight, the roll angle of the projectile typically must be determined with respect to a (frequently earth-bound) reference value in order to ignite the corresponding correction charge at the correct position.

It is already known to determine the roll angle by means of magnetic sensors. In this method, a magnetic sensor connected to the projectile periodically intersects different field lines of the geomagnetic field as the projectile rotates, so that a periodic signal which is characteristic for the rpm of the projectile results at the sensor output. However, in order to obtain an unambiguous allocation of the angular position of the projectile to an earth-bound reference system, it is necessary to dispose a magnet in the region of the barrel muzzle of the firing or launch apparatus. This magnet transmits or transfers a corresponding reference signal to the projectile as it exits the barrel.

The disadvantages of roll angle determination using magnetic sensors are the relatively high costs and the relatively high wear of the muzzle magnet.

Also known are optical/visual methods of determining the roll angle of the flying body. These methods employ a laser beam, which is being used as a guide beam for the flying body anyway, and make use of the polarization of this guide beam. The rotation of the flying body is detected by the change in intensity of the received radiation that passes through a rotating polarization filter (analyzer) connected to the flying body. Since the angular position of the flying body can only be determined with modulo 180° in this case, an unambiguous allocation of the projectile coordinates to a (e.g., earth-bound) reference system is likewise necessary at the beginning of the firing process. This allocation can be achieved by the lateral arrangement of a transmitter in the firing device, and with a second, laterally offset detector in the flying body. The latter fixes the position of the projectile in the immediate vicinity of the weapon. Thereafter, the position is determined through counting of the polarization transmissions.

A disadvantage shared by this arrangement is the relatively high outlay or cost for equipment; in particular, an additional transmitter must be provided in the firing apparatus.

A number of methods of determining the roll angle position are also conceivable; with a typical prerequisite of these methods being that the flying body always move in a path that is coaxial with the guide beam. Thus, for example, a non-mirror-symmetric screen on the side of the laser and a corresponding screen on the side of the flying body could be brought into the beam path of the guide beam, with the screens being configured such that a maximum brightness would only result behind the screen on the side of the flying body if the two identically-shaped screens were oriented parallel to one another. A coaxial arrangement of the guide beam and the receiver, however, represents the exception, and therefore cannot usually be a prerequisite.

SUMMARY OF THE INVENTION

It is an object of the invention to provide a method and an apparatus of the type mentioned at the outset for determining the roll angle position, with the method and apparatus being simple, cost-effective and moreover precise, and in which the flying body can be located at an arbitrary position within the guide beam.

With regard to the method of the invention, the object generally is accomplished by a method of determining the roll angle position of a rotating flying body relative to a fixed station with the aid of a laser light beam emitted by the fixed station and received by the flying body, including the steps of: phase coding the laser light beam by bringing a holographic element into the beam path of the laser light in the region of the fixed station; decoding the laser light beam in the flying body by passing the coded light beam through a further holographic element rigidly connected to the flying body, with the further holographic element on the flying body being such that maximum brightness of the passing light beam only occurs at a first receiving detector disposed in the flying body if the further holographic element on the flying body and the holographic element at the fixed station have identical angular positions; detecting the light beam passed through the further holographic element with the first receiving detector; and further processing the changes in brightness of the detected light beam in electronics disposed downstream of the first receiving detector.

Preferably the roll angle position is only measured and determined from the light detected by the first receiving detector in a first, predetermined distance range from the fixed station; and the method further comprises measuring the number of rotations of the flying body; and subsequently determining the roll angle position with respect to the fixed station through extrapolation of the position value determined in the first distance range with consideration of the measured number of rotations of the flying body. Moreover, the step of measuring the number of rotations of the flying body preferably comprises: polarizing the laser light beam emitted by the fixed station and received by the flying body; passing the light beam through a polarization filter connected to the flying body; and detecting the change in intensity of the received radiation that passes through the polarization filter.

The above object generally is achieved for the apparatus aspect of the invention by an apparatus for determining the roll angle position of a rotating flying body relative to a fixed station, which comprises a laser apparatus disposed at the fixed station for producing a laser guide beam, a first optical holographic element having at least one of an amplitude structure and a phase structure disposed in the laser guide beam at the fixed station for coding the laser beam with a defined amplitude structure or phase structure, and a receiving apparatus for the laser guide beam disposed in a bottom of the flying body, with the receiving apparatus including: a first receiving detector; a further holographic element mounted in the bottom of the flying body for rotation therewith, and through which the laser beam passes before it arrives at the receiving detector, with the further holographic element being such that maximum brightness only occurs at the first receiving detector if the first holographic element and the second holographic element have the same angular positions; and electronics for evaluating the output signals from the first receiving detector. According to a feature of the apparatus, the first receiving detector is disposed in the flying body to be oriented parallel to the axis of the laser beam.

According to the preferred embodiment of the apparatus according to the invention, the further holographic element is additionally configured as a polarizer, and the receiving apparatus further comprises means, including a second receiving detector disposed in the bottom of the flying body for receiving the light beam passing through the second holographic element, for measuring the change in intensity of the polarized laser light passing through the second holographic element that rotates with the flying body. Further, advantageous features of the invention are disclosed in the specification and recited in the claims.

The essential concept of the invention is to use a guide beam that has been phase-coded with the aid of a holographic element to determine the roll angle position of a flying body. This guide beam is then decoded in a receiving apparatus of the flying body by means of a further holographic element that is rigidly connected to the flying body. The further holographic element is configured such that maximum brightness or intensity only occurs at the receiving detector if the holographic element is parallel to the holographic element on the laser side (i.e., non-mirror-symmetrical information must be impressed onto the guide beam).

Because the information is only stored as phase information in the guide beam, it is no longer necessary to align the receiving detector of the flying body to be coaxial to the guide beam. Rather, the receiving detector can be located at some position within the guide beam, in which case, of course, it must be presupposed that it be oriented parallel to the guide beam axis within certain limits.

In a particularly advantageous embodiment of the invention, the precise roll angle position of the flying body is only determined in the immediate vicinity of the firing apparatus according to the method of the invention, and— similarly to the description at the outset—the position of the flying body is subsequently determined in the flying body by means of extrapolation employing the changes in intensity and a polarization filter. The apparatus for performing the method is designed in a particularly simple manner when the holographic element on the side of the flying body is configured as a polarizer.

Further details and advantages of the invention ensue from the following embodiments explained in conjunction with drawing figures.

DETAILED DESCRIPTION OF THE PREFERRED EMBODIMENT

Figure 1:
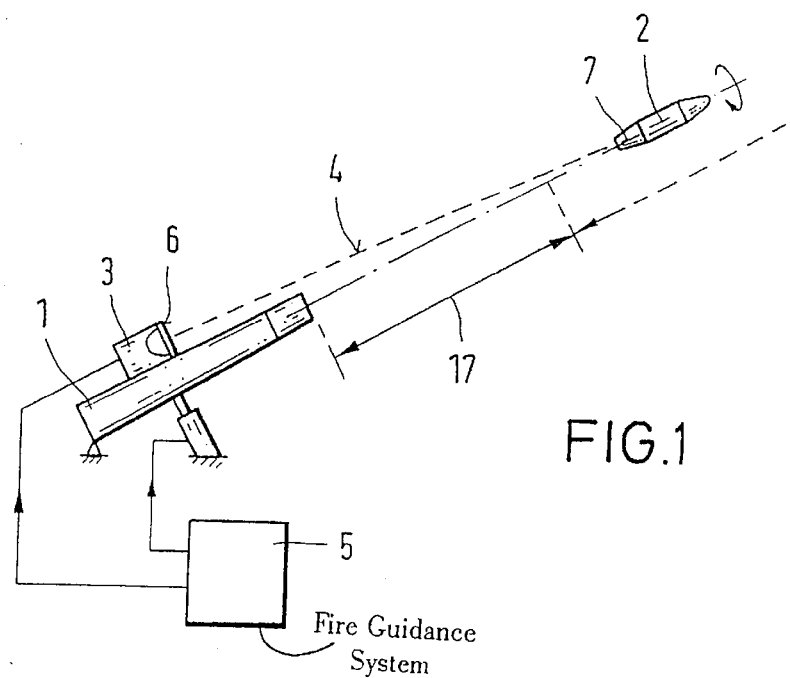
FIG. 1 is a schematic illustration of an apparatus according to the invention, comprising a firing apparatus for a spin-stabilized projectile that includes a laser arrangement according to the invention.

In FIG. 1, there is shown a firing apparatus 1 for firing spin-stabilized projectiles 2. Connected to firing apparatus 1 in a conventional manner are a laser apparatus 3 for the purpose of producing a guide beam 4, and a fire-guidance system indicated by reference numeral 5. According to the invention, the guide beam 4 is amplitude or phase-coded with the aid of a holographic element 6 disposed on the laser apparatus 3, and this guide beam 4 enters a receiving apparatus 8 (see FIG. 2) disposed in the bottom 7 of the projectile 2.

Figure 2:
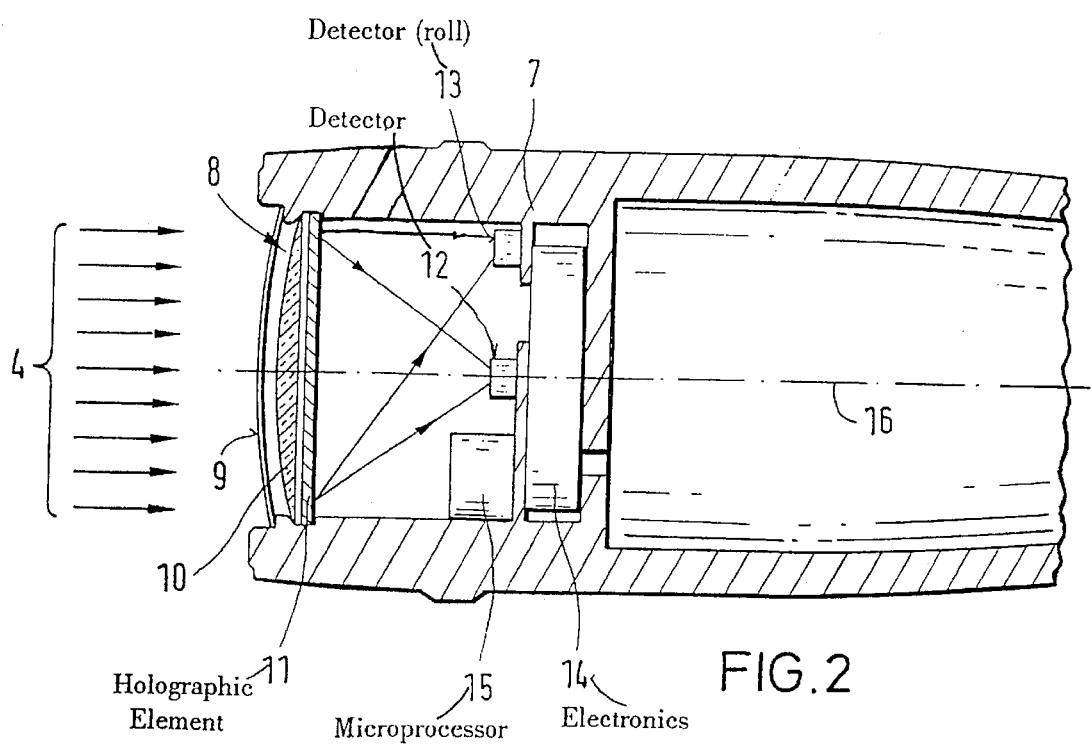
FIG. 2 is a schematic longitudinal section view through the bottom-side or rear part of a flying body having a receiving arrangement according to the invention.

As shown in FIG. 2, the receiving apparatus 8 is protected toward the outside by a transparent cover plate or a protective plate 9, which falls off after the projectile 2 exits the barrel of the firing apparatus 1. The receiving apparatus 8 essentially comprises a lens 10, a further holographic element 11, which is connected rigidly at its edge to the projectile bottom 7 for movement with the projectile 2, as well as two receiving detectors 12, 13 with appropriate electronics 14 having a downstream microprocessor 15. According to the preferred illustrated embodiment, the holographic element 11 additionally is configured as a polarizer or polarization filter.

Guide beam 4, which is linear-polarized and amplitude and/or phase-modulated with the aid of holographic element 6 (FIG. 1), passes through the cover plate 9, lens 10 and holographic element 11 and reaches receiving detector 12, and likewise enters receiving detector 13 due to scattering at the structure of the holographic element 11. Receiving detector 12 serves, in conjunction with holographic element 11, which acts as a polarizer or polarization filter, to determine the rotational speed (rpm) or number of revolutions of the projectile 2.

For this purpose, the fluctuations in intensity that result during the rotation of projectile 2 and thus of element 11 (the direction of polarization of laser beam 4 remains constant during measurement) are measured with detector 12, which as illustrated is located along the longitudinal axis 16 of the projectile 2.

According to the invention, receiving detector 13 serves in determining the absolute roll angle position of projectile 2 preferably in a first distance range 17 (FIG. 1) in the immediate vicinity of the muzzle of the firing apparatus 1. Detector 13 always obtains maximum brightness or intensity when the two holographic elements 6 and 11 are parallel to one another. Since the information impressed by holographic element 6 is only stored as phase information in guide beam 4, it is no longer necessary to align the projectile 2, along with holographic element 11 and receiving detector 13, to be coaxial with the guide beam 4. Receiving detector 13 is disposed at a location in the rear portion 7 of the projectile 2 that is defined by the receiving geometry of the holographic element 11 and thus also, as illustrated, for example, in FIG. 2, is disposed at the upper, outer edge of receiving apparatus 8.

After the determination of the roll angle position of projectile 2 in the immediate vicinity range 17, the further determination of the roll angle position can be effected by means of extrapolation using the rpm or rotational speed of projectile 2 determined with the receiving detector 12 and the subsequent electronics.

Figure 3:
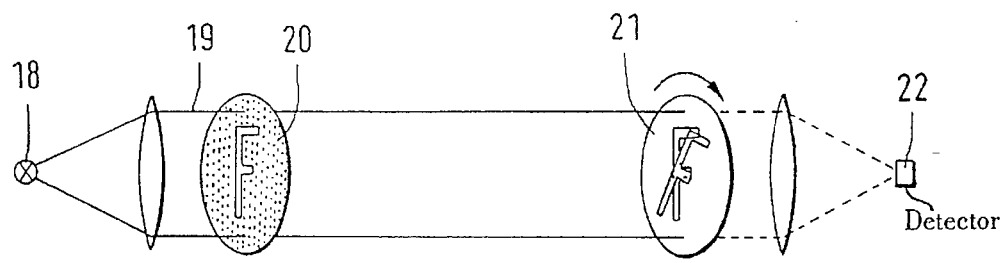
FIGS. 3 and 4 are schematic representations for optical/ visual determination of the roll angle position for clarifying the function of the invention.

The advantage of the use of holographic elements 6 and 11 (FIGS. 1 and 2) is reiterated below with the aid of FIGS. 3 and 4. FIG. 3 shows an arrangement that is possible in principle for unambiguous determination of the roll angle.

Reference numeral 18 indicates a light source that produces a light beam (guide beam) 19, which is not necessarily polarized, and passes through a screen 20 and a screen 21 that rotates with the projectile (not shown for the sake of a clear overview), and reaches a receiving detector 22. To permit the unambiguous recognition of the projectile position, non-mirror-symmetric information must be impressed onto the guide beam 19. In the presently illustrated case, the impression of the non-mirror symmetric information is achieved in that the openings of the two screens 20, 21 are F-shaped. As can be taken directly from FIG. 3, an unambiguous recognition of position only results in this arrangement if receiving detector 22 is always located coaxially in the guide beam 19.

Figure 4:
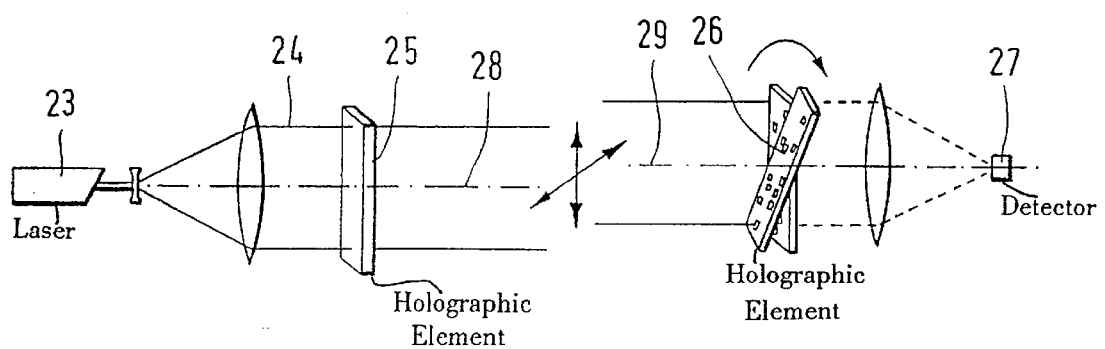

This coaxial location is not necessary in the arrangement of the invention shown schematically in FIG. 4. In FIG. 4, the light source, in this case a laser, is indicated by 23, while the guide beam is indicated by 24, and a first holographic element is indicated by 25. Guide beam 24 is phase-modulated by the holographic element 25, and reaches a receiving detector 27 via a second holographic element 26 disposed on the projectile. As indicated in FIG. 4 by the center axes provided with reference numerals 28 and 29, the receiving detector 27 need not be aligned coaxially to the guide beam 24. Rather, the detector 27 can be in a position parallel to the axis of the guide beam. The superposition of at least two wave fields is stored as an interference pattern in the holographic element 11 fastened to the projectile 2. Based on the holographic principle, when element 11 is irradiated with one of these wave fields, the respective other wave field is reconstructed at the correct angular position in the guide beam. The lateral position in the guide beam is not significant. One of these wave fields is generated by a point light source, i.e., the laser 3, whose reconstructed image arrives at detector 13.

The invention now being fully described, it will be apparent to one of ordinary skill in the art that any changes and modifications can be made thereto without departing from the spirit or scope of the invention as set forth herein.

What is claimed:

1. A method of determining the roll angle position of a rotating flying body relative to a fixed station with the aid of a laser light beam emitted by the fixed station and received by the flying body, said method comprising the steps of: phase coding the laser light beam by the use of a holographic element in the beam path of the laser light in the region of the fixed station; decoding the laser light beam in the flying body by passing the coded light beam through a further holographic element rigidly connected to the flying body, with the phase information the further holographic element on the flying body being such that maximum brightness of the passing light beam only occurs at a first receiving detector disposed in the flying body if the further holographic element on the flying body and the holographic element at the fixed station have identical angular positions; detecting the light beam passed through the further holographic element with the first receiving detector; and further processing the changes in brightness of the detected light beam in electronics disposed downstream of the first receiving detector to determine the roll angle position.

2. A method as defined in claim 1, wherein the roll angle position is only measured and determined from the light detected by the first receiving detector in a first, predetermined distance range from the fixed station; and wherein said method further comprises measuring the number of rotations of the flying body; and, subsequent to the determination of the roll angle position in the first predetermined distance range, determining the roll angle position with respect to the fixed station through extrapolation of the roll angle position value determined in the first distance range with consideration of the measured number of rotations of the flying body.

3. A method as defined in claim 2, wherein said step of measuring the number of rotations of the flying body comprises: polarizing the laser light beam emitted by the fixed station and received by the flying body; passing the light beam through a polarization filter connected to the flying body; and detecting the number of changes in intensity of the received radiation that passes through the polarization filter as a measure of the number of rotations of the flying body.

4. An apparatus for determining the roll angle position of a rotating flying body relative to a fixed station, comprising a laser apparatus disposed at the fixed station for producing a laser guide beam, a first optical holographic element having at least one of an amplitude structure and a phase structure disposed in the laser guide beam at the fixed station for coding the laser beam with a defined amplitude structure or phase structure, and a receiving apparatus for the laser guide beam disposed in a bottom of said flying body, with said receiving apparatus including: a first receiving detector; a further holographic element mounted in the bottom of the flying body for rotation therewith, and through which the laser beam passes before it arrives at said first receiving detector, with said further holographic element being such that maximum brightness only occurs at said first receiving detector if said first holographic element and the said second holographic element have the same angular positions; and electronics for evaluating the output signals from said first receiving detector to determine the roll angle position of said flying body.

5. An apparatus as defined in claim 4, wherein said first receiving detector is disposed in said flying body to be oriented parallel to and offset from the axis of the laser beam.

6. An apparatus as defined in claim 5, wherein said further holographic element additionally includes a polarizer, and said receiving apparatus further comprises means, including a second receiving detector disposed in the bottom of said flying body for receiving the light beam passing through the second holographic element, for measuring the change in intensity of the polarized laser light passing through said second holographic element that rotates with said flying body.

7. An apparatus as defined in claim 6, wherein said second receiving detector is disposed along the longitudinal axis of said flying body.

8. An apparatus as defined in claim 4, wherein said further holographic element additionally includes a polarizer, and said receiving apparatus further comprises means, including a second receiving detector disposed in the bottom of said flying body for receiving the light beam passing through the second holographic element, for measuring the change in intensity of the polarized laser light passing through said second holographic element that rotates with said flying body.

9. An apparatus as defined in claim 8, wherein said second receiving detector is disposed along the longitudinal axis of said flying body.

10. Apparatus as defined in claim 4, wherein second flying body is a spin-stabilized projectile.

* * * * *